Sept. 2, 1947.  D. E. AUSTIN  2,426,582
VEHICLE BODY CONSTRUCTION
Filed Nov. 29, 1943   2 Sheets-Sheet 1
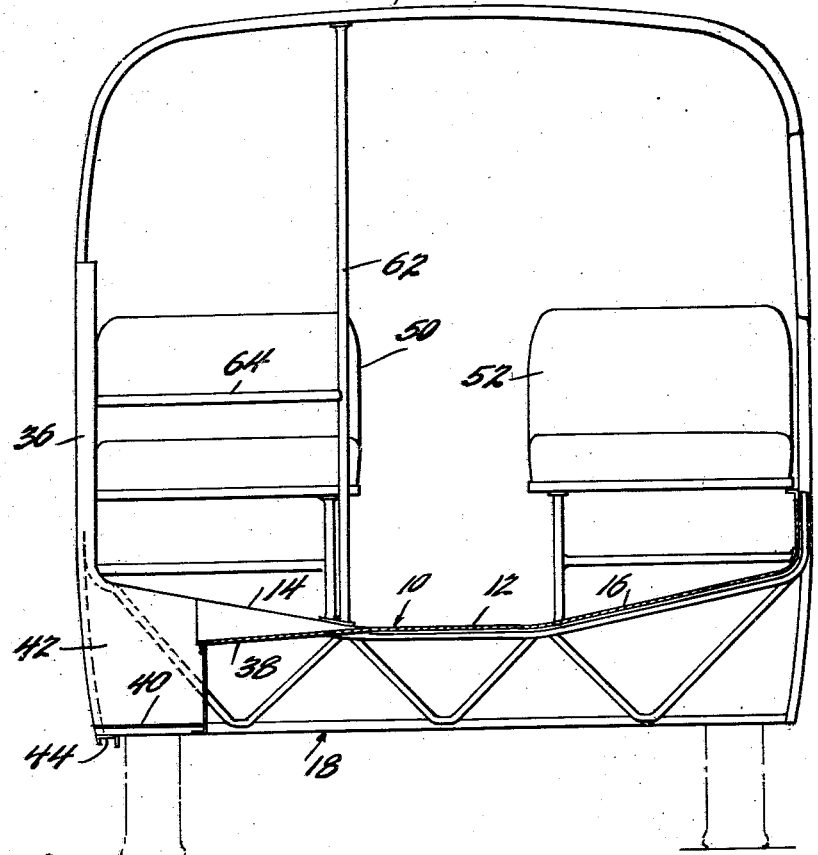
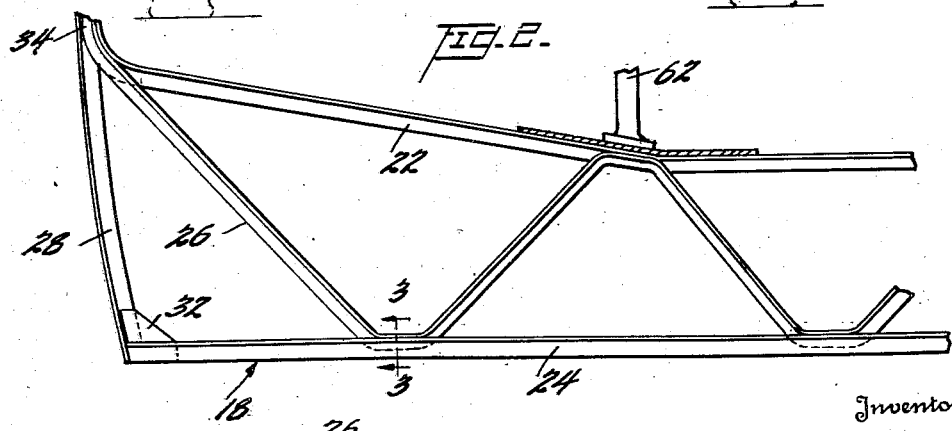
Inventor
Dwight E. Austin
By Strauch & Hoffman
Attorneys Sept. 2, 1947.  D. E. AUSTIN  2,426,582
VEHICLE BODY CONSTRUCTION
Filed Nov. 29, 1943  2 Sheets-Sheet 2
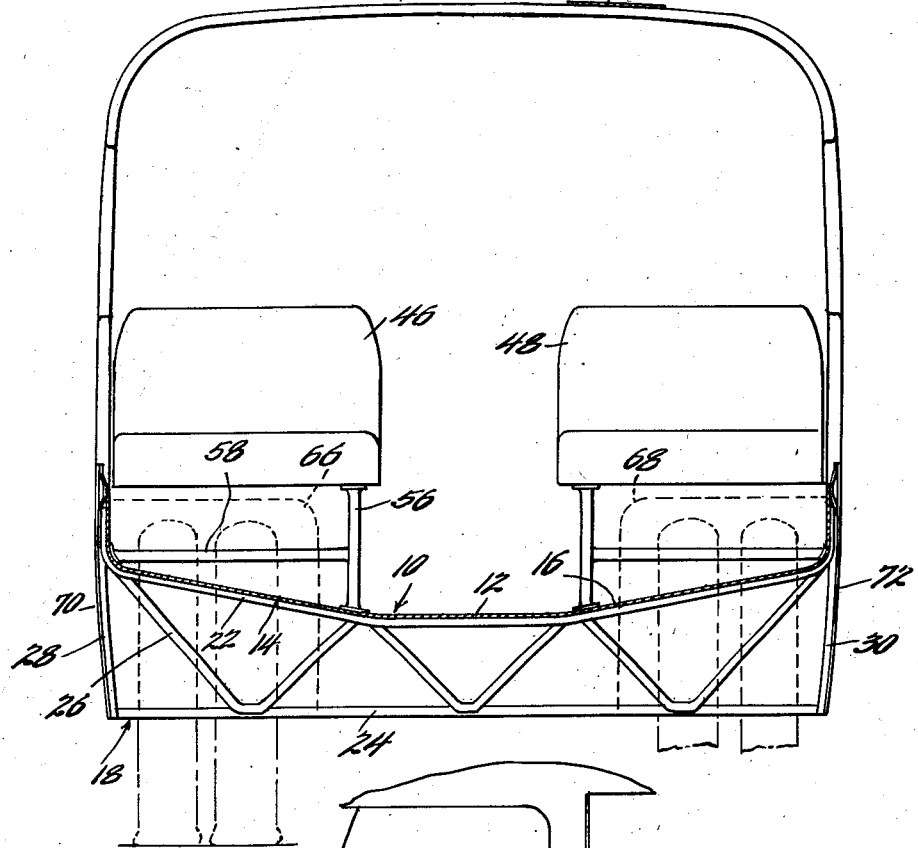
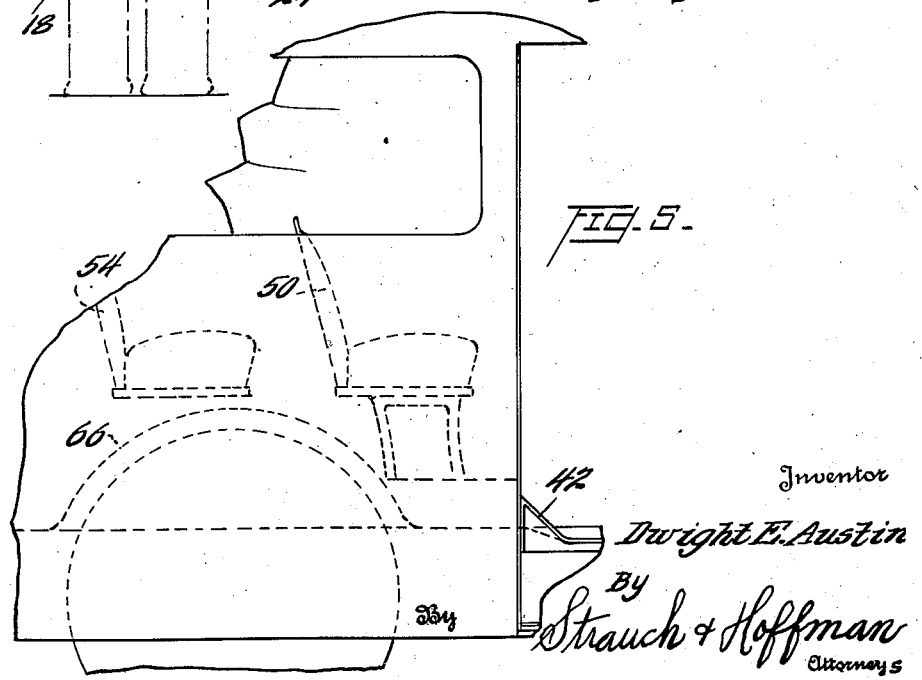
Inventor
Dwight E. Austin
By Strauch & Hoffman
Attorneys Patented Sept. 2, 1947

2,426,582

UNITED STATES PATENT OFFICE 2,426,582

VEHICLE BODY CONSTRUCTION

Dwight E. Austin, Kent, Ohio, assignor to Twin Coach Company, Kent, Ohio, a corporation of Delaware Application November 29, 1943, Serial No. 512,177

1 Claim. (Cl. 296—28)

This invention relates to improvements in vehicle body structures and has particular reference to an improved body structure for a chassisless type vehicle in which the axle attaching springs and the engine and associated driving mechanism are connected directly to structural members which are a part of or are carried by structural parts of the vehicle body.

Chassisless vehicles of this general type are well known and in wide use as passenger carrying buses but in the prior designs relatively high floor levels have been required to provide the necessary clearance and space below the floor for the vehicle running gear and equipment, which in turn has necessitated the use of comparatively high bodies to provide desirable passenger head room, and relatively heavy structures with relatively high centers of gravity, compared to the present invention, to provide rigidity.

It is therefore among the objects of the present invention to provide an improved vehicle body structure of the character indicated which is of improved strength and rigidity and lighter in weight than the prior chassisless or so-called "frameless" vehicles, while at the same time providing a substantially lower interior floor level center of gravity and overall height without sacrificing desirable passenger head room.

A further object resides in the provision, in a vehicle body of the character indicated, of a floor and body frame structure so arranged that readily accessible, comfortable passenger seats may be positioned above the necessary wheel housings, while maintaining a relatively low floor level and over-all vehicle height with adequate head room for passengers between the center portion of the floor and the top of the vehicle.

A still further object resides in the provision of a vehicle body of the character indicated in which adequate and convenient space is provided below the floor for underfloor motors, batteries, compressors, drive and control members and the like.

An additional object resides in the provision of an improved vehicle body of the character indicated having entrance and exit wells provided with floor sections one convenient step height above the ground, and one convenient step height below low level floors of the entrance exit and aisle passages.

Another object resides in the provision of an improved vehicle floor having a dropped aisle portion which is easy to clean and has valuable self cleaning characteristics.

Other objects and advantages will be more particularly pointed out hereinafter or will become apparent as the description proceeds.

In the accompanying drawings, in which like reference numerals are used to designate similar parts throughout, a preferred embodiment of the invention is disclosed. The drawings, however, are for the purpose of illustration only and are not to be taken as limiting or restricting the scope of the patent protection since it will be apparent to those skilled in the art that various changes in the illustrated embodiment may be resorted to without in any way exceeding the scope of the invention.

In the drawings:

Figure 1 is a transverse sectional view of the vehicle body, showing the construction of a door passage and step well of a body embodying my invention;

Figure 2 is an elevational view on a somewhat enlarged scale of a fragmentary portion of the vehicle floor supporting truss shown in Figure 1;

Figure 3 is a detail sectional view on an enlarged scale taken on the line 3—3 of Figure 2;

Figure 4 is a transverse sectional view through a portion of the vehicle body spaced from the entrance door passage; and Figure 5 is a side elevational view of a fragmentary portion of the vehicle body showing the location of seats with relation to a wheel housing and a door opening in the vehicle body.

Referring to Figures 1 and 4, the vehicle floor, generally indicated at 10, is a continuous or unitary structure comprising a center substantially level aisle portion 12 extending longitudinally of the vehicle and flanked by two side portions 14 and 16, which are inclined laterally upward from the aisle portion to the respective sides of the vehicle body. Below the floor portions are a series of spaced transverse trusses, one of which is generally indicated at 18 in Figures 1, 2 and 4.

The truss members are all open work trusses of similar construction and as shown in Figure 2 preferably consist of a bent angle section stringer 22 disposed immediately below the floor 10 and following the contour thereof from side to side; a straight angle section member 24 extending transversely across the vehicle below the member 22; a continuous bent angle member 26 providing a series of diagonal braces triangulating the space between the members 22 and 24; and end members 28 and 30 which close the ends of the truss member and also constitute vertical ribs of the body (Figures 1 and 4). As indicated in Figures 1 and 4 these vertical members 28 and 30 may be, in effect, continuous bow members extending up the sides and across the top of the body.

The members 22, 24, 26, 28 and 30 are all secured together by suitable means such as welding or riveting, and are preferably arranged so that the angular cross section of the contacting portion of the brace member 26 sits upon the angular cross section of the lower member 24, as illustrated in Figure 3, and the angular cross section member 26 fits within the angular cross section of stringer member 22 in the same manner, member 26 being securely welded to the members 22 and 24 at the areas of contact. The members 28 and 30 may be secured to the member 24 by welding the adjoining ends of both members to suitable gusset plates, one of which is indicated at 32 in Figure 2, and the members 28, 26 and 22 and similar members 30, 26 and 22 may be welded together with a joint at the outer edge of the floor structure, as indicated at 32.

Opposite the vehicle doorway 36 (Figure 1) the adjacent inclined floor portion 14 is cut away for substantially the width of the doorway and within this space there is provided a passage floor 38 and a step 40 one convenient step height below the level of 38. To provide this convenient step height 38 is sloped downward slightly from aisle section 12. The ends of the passage floor are joined to the inclined floor section 14 by continuous upwardly inclined portions, as indicated at 42 in Figure 5, and the spaces at the ends of the step 40 are covered by suitably shaped plates, one of which is indicated at 42 in Figure 1. A reinforcing member 44 may be provided below the step 40 to strengthen the connection between the trusses at the opposite sides of the door opening.

It will be noted that the door opening, passageway and step are provided between two adjacent truss members and that no truss member is cut into or otherwise deformed in order to provide the door, step and passage construction.

Seats, as indicated at 46 and 48 in Figure 4, 50 and 52 in Figure 1 and 50 and 54 in Figure 5, are provided in rows, the seats in each row being arranged at properly spaced intervals along the inclined floor portions 14 and 16. The aisle end of each seat is mounted upon a suitable supporting structure 56 in the form of a pair of tubular columns or legs extending from the lower surface of the seat to the floor substantially at the junction between the respective inclined side portion and the aisle portion 12. At their outer ends the seats may be secured to the sides of the body by any suitable means, not illustrated. Each seat is provided with a substantially horizontal foot rest 58 which is a convenient chair height below the seat level and extends from the point at which the inclined floor portion joins the side of the vehicle to the respective leg structure 56 and may conveniently comprise a fixed tube or strip secured at its respective ends to the floor section and to the seat leg structure. The foot rest for the seat next to the door opening 36 may conveniently be secured to the front vertical column or post 62 supporting the guard rail 64 and this structure strengthens the body. It will be noted the foot rest and seat arrangements provide comfortable seating for the passengers over the inclined floor sections, while the inclined floor sections provide safe passenger access to and from the seats without danger of false steps or stumbling by the passengers incident to prior proposed depressed bus body aisles in which the passengers must step up to and down from the floor level under the seats.

A further material advantage of the improved floor construction with the inclined side portions smoothly joining the aisle portion and the vehicle walls is the ease of cleaning and relative freedom from accumulation of dirt and debris. Not only do the smooth floor and elevated inner seat portions permit easy access with cleaning implements but the inclined side floor portions, when subjected to the normal shaking and vibration incident to operation of the vehicle, cause foreign matter, such for instance as cigarette stubs, match stubs, paper scraps, tracked in cinders, moisture from snow, etc., to move to the depressed aisle portion from which it can be easily swept to the door opening.

As shown in Figures 4 and 5 the wheel housings or recesses 66 and 68 have their uppermost portions below the lower surfaces of the seats and do not interfere materially with the seating capacity of the vehicle.

By the foregoing arrangement the level of the seats is maintained above the height of the wheel housings or recesses, the overall height of the vehicle is maintained at a minimum and yet ample head room is provided over the aisle portion of the floor and over the vehicle seats. At the same time the somewhat concave floor structure provides for safe access and exit from the seats and a floor of substantial lengthwise rigidity which is able to absorb some of the compressive forces as well as tension forces extending along the length of the vehicle and assists in maintaining the transverse trusses parallel and equally spaced.

The body is further reinforced by longitudinal side plates 70 and 72 which overlie and are connected to the ends of the transverse trusses and cooperate with the floor 10 in maintaining these trusses in parallel spaced relationship and in absorbing forces acting longitudinally of the vehicle body. Bending forces acting on the body are resisted, not only by the floor, truss and longitudinal member construction, but also by the construction of the top plates 74 and upper portions of the body sides so that the body provides a relatively rigid, unitary structure capable of carrying the axles and power plant of the vehicle without undue strain or distortion.

The invention may be embodied in other specific forms without departing from the spirit or essential characteristics thereof. The present embodiment is therefore to be considered in all respects as illustrative and not restrictive, the scope of the invention being indicated by the appended claim rather than by the foregoing description, and all changes which come within the meaning and range of equivalency of the claim are therefore intended to be embraced therein.

What is claimed and desired to be secured by United States Letters Patent is:

In a vehicle body having two rows of seats therein, a floor having a substantially level central aisle portion extending longitudinally of said body and laterally from one row of seats to the other; seat supporting portions extending along said aisle portion one at each side thereof and inclined uniformly upwardly from said aisle portion to the respective sides of said body; a series of transverse floor supporting trusses immediately below said floor joined at their ends to the side walls of said body; said seats extending transversely across said inclined floor portions; and seat supporting means including horizontal foot rests rigidly secured at their outer ends to the body side walls substantially at their juncture with said inclined floor portions.

DWIGHT E. AUSTIN.

REFERENCES CITED

The following references are of record in the file of this patent:

UNITED STATES PATENTS

| Number | Name | Date |
|---|---|---|
| 1,892,666 | Gurney | Jan. 3, 1933 |
| 1,636,505 | Fairbanks | July 19, 1927 |
| 2,119,655 | Stout | June 7, 1938 |
| 401,529 | Zurcher | Apr. 16, 1889 |
| 2,330,182 | Theriault | Sept. 21, 1943 |
| 316,735 | Buntin | Apr. 28, 1885 |

FOREIGN PATENTS

| Number | Country | Date |
|---|---|---|
| 429,661 | Great Britain | June 4, 1935 |
| 329,204 | Great Britain | May 15, 1930 |
| 844,820 | France | May 1, 1939 |